(12) United States Patent
Nishimura

(10) Patent No.: US 6,187,460 B1
(45) Date of Patent: *Feb. 13, 2001

(54) MAGNETO-OPTICAL RECORDING MEDIUM AND METHOD FOR REPRODUCING INFORMATION THEREIN

(75) Inventor: Naoki Nishimura, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/904,888

(22) Filed: Aug. 4, 1997

Related U.S. Application Data

(63) Continuation of application No. 08/224,749, filed on Apr. 7, 1994, now abandoned.

(30) Foreign Application Priority Data

Apr. 8, 1993 (JP) .................................................... 5-081962

(51) Int. Cl.⁷ ............................. G11B 5/66; B32B 15/01; B32B 15/04
(52) U.S. Cl. ..................... 428/694 MM; 428/694 GR; 428/694 RE; 369/13; 369/286; 369/116
(58) Field of Search ........................... 428/64.3, 694 MC, 428/694 SC, 694 MT, 694 RE, 694 MM, 694 EC, 694 GR, 694 LE; 369/13, 272, 283, 286, 288, 116, 121

(56) References Cited

U.S. PATENT DOCUMENTS

| | | | |
|---|---|---|---|
| 4,293,621 | * | 10/1981 | Togami .................................. 428/678 |
| 5,014,252 | * | 5/1991 | Akasaka et al. .......................... 369/13 |
| 5,248,565 | * | 9/1993 | Tsutsumi et al. ............... 428/694 EC |
| 5,428,585 | * | 6/1995 | Hirokane et al. ........................ 369/13 |
| 5,486,395 | * | 1/1996 | Murakami et al. .................. 428/64.3 |
| 5,563,852 | * | 10/1996 | Murakami et al. ...................... 369/13 |
| 5,662,988 | * | 9/1997 | Nakayama et al. ................... 428/212 |
| 5,705,286 | * | 1/1998 | Hirokane et al. ............. 428/694 ML |

FOREIGN PATENT DOCUMENTS

| | | |
|---|---|---|
| 509836 | 10/1992 | (EP) . |
| 243840 | * 12/1985 | (JP) . |
| 3-93058 | 4/1991 | (JP) . |

OTHER PUBLICATIONS

Nishimura et al. "Transitio9n from Inplane to Perpendicular . . . " in J. Appl. Phys. 79(8), pp. 5683–5685 (Apr. 1996).*

* cited by examiner

*Primary Examiner*—Deborah Jones
*Assistant Examiner*—Michael LaVilla
(74) *Attorney, Agent, or Firm*—Fitzpatrick, Cella, Harper & Scinto

(57) ABSTRACT

A magneto-optical recording medium includes a first magnetic layer and a second magnetic layer. The first magnetic layer is a horizontal magnetization layer at room temperature but a perpendicular magnetization layer at a raised temperature. A transition temperature of the first layer continuously or stepwise increases from a light incidence side thereof light in a film thickness direction. The second magnetic layer is a perpendicular magnetization layer both at room temperature and at the raised temperature. In reproduction of information, an optical beam is applied onto the magneto-optical recording medium in which information is recorded by directions of magnetization. The information recorded in the second magnetic layer is transferred to the first magnetic layer and the information is read by the magneto-optical effect.

3 Claims, 6 Drawing Sheets

(BEFORE REPRODUCTION)

(UPON REPRODUCTION)

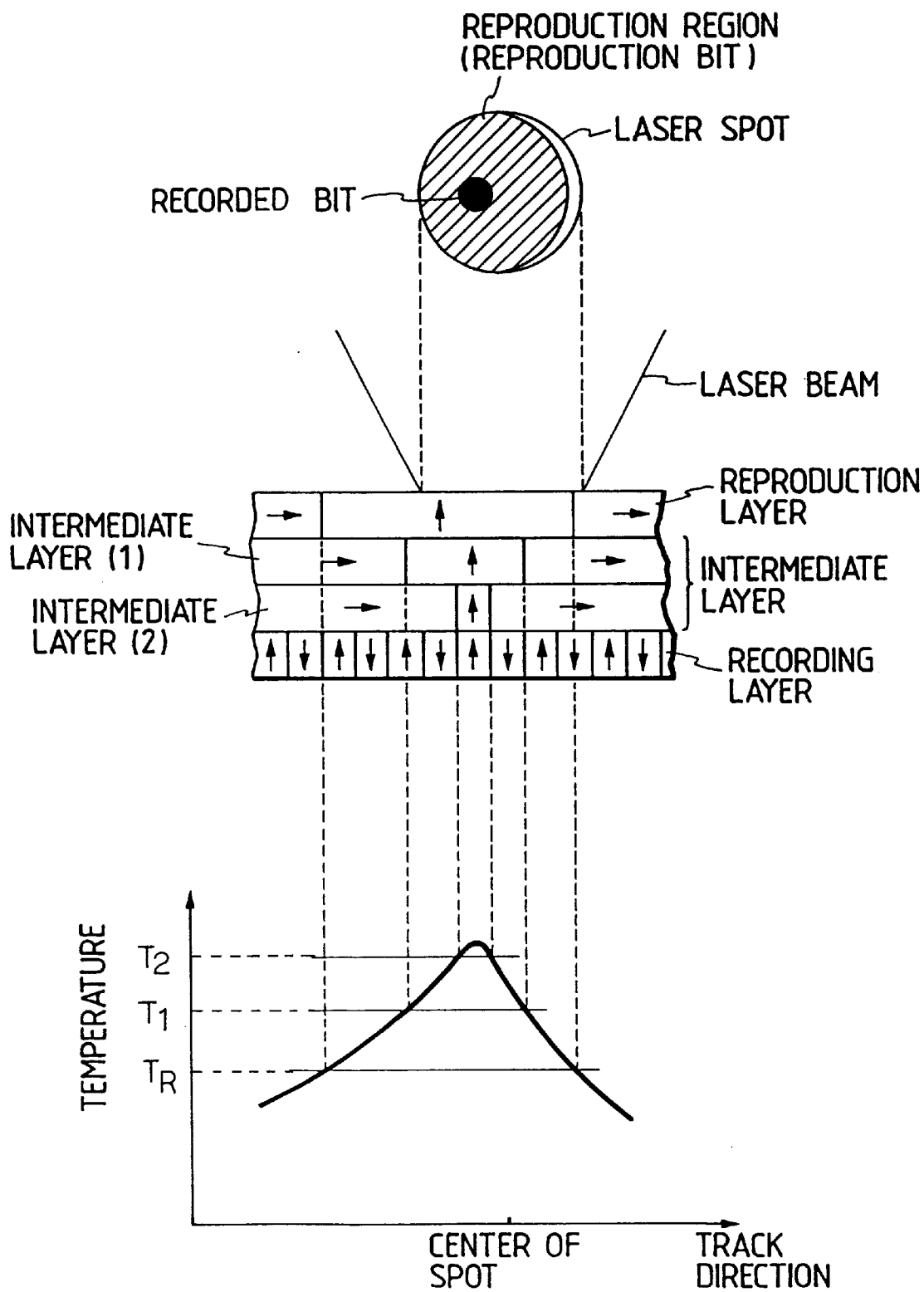

(BEFORE REPRODUCTION)

(UPON REPRODUCTION)

REPRODUCTION LAYER $M_V$ : VERTICAL MAGNETIZATION
$M_H$ : HORIZONTAL MAGNETIZATION

INTERMEDIATE LAYER (1)

$M_V$ : VERTICAL MAGNETIZATION
$M_H$ : HORIZONTAL MAGNETIZATION

INTERMEDIATE LAYER (2)

$M_V$ : VERTICAL MAGNETIZATION
$M_H$ : HORIZONTAL MAGNETIZATION

MAGNETO-OPTICAL RECORDING MEDIUM AND METHOD FOR REPRODUCING INFORMATION THEREIN

This application is a continuation of Application Ser. No. 08/224,749, filed Apr. 7, 1994 now abandoned.

BACKGROUND OF THE INVENTION

1. Field of the Invention

The present invention relates to a magneto-optical recording medium for recording or reproducing information therein with a laser beam by utilizing the magneto-optical effect. More particularly, the present invention relates to a magneto-optical recording medium which can increase the density of information recorded in the medium and a method for reproducing information therein.

2. Related Background Art

As a rewritable high-density recording method, attention has been directed to a magneto-optical recording medium in which magnetic domains are written on a magnetic thin layer by thermal energy of a semiconductor laser to record information, and from which the information is read using the magneto-optical effect.

Recently demand is high to increase a recording density of the magneto-optical recording medium so as to provide a larger storage recording medium has become high.

A linear recording density of an optical disc such as the magneto-optical recording medium is determined mainly by an S/N ratio of a reproduction layer, which depends considerably on a bit string cycle of a signal, a laser wavelength of a reproduction optical system and a numerical aperture of an objective lens.

Namely, once a laser wavelength $\lambda$ of a reproduction optical system and a numerical aperture NA of an objective lens are determined, a bit cycle f serving as a detection limit is also determined to be $\lambda/2NA$.

On the other hand, a track density of and optical disc is restricted mainly by cross talk. The cross talk depends mainly on a distribution (profile) of a laser beam on a surface of the medium and is represented by a same function of $\lambda/2NA$ as the above-mentioned bit cycle.

Accordingly, in order to increase the density of information to be recorded with a conventional optical disc, the laser wavelength of a reproduction optical system needs to be shortened and the numerical aperture NA of an objective lens needs to be enlarged.

However, there are limitations as to an improvement in the laser wavelength and an improvement in the numerical aperture of an objective lens. Therefore, techniques have been developed such that a structure of a recording medium or a reading method is improved so as to increase the recording density.

For example, Japanese Laid-open Patent Application No. 3-93058 attempted to improve the recording density by using a medium having a reproduction layer and a recording layer. Namely, magnetization in the reproduction layer is aligned with one direction before reproducing information, and then the information held in the recording layer is transferred to the reproduction layer so as to decrease inter-symbol interference upon reproduction, whereby information with a cycle less than the diffraction limit of light can be reproduced.

However, Japanese Laid-open Patent Application No. 3-93058 has such a drawback that an adequate reproduction power cannot be obtained. In more detail, each bit in the recording layer is transferred to the reproduction layer and reproduced therefrom in the same size as it is recorded. Since the each bit is recorded in the recording layer with a size considerably smaller than the size of a laser spot, the resolving power will be very low for such small bits.

Further, since the magnetization in the reproduction layer must be aligned in one direction before irradiation by a laser beam, an initialization magnet for the reproduction layer needs to be added to a conventional apparatus. Therefore, the above-mentioned reproduction method has such problems that the magneto-optical recording apparatus is complicated, the cost is high and miniaturization is hardly possible.

SUMMARY OF THE INVENTION

The present invention has been accomplished to solve the above problems. An object of the present invention is to provide a magneto-optical recording medium and a method for reproducing information therein, by which sufficient resolving power can be obtained in reproducing information, by which information with a cycle less than the diffraction limit of light can be reproduced, and which enable reduction in the size of apparatus.

The above object can be attained by a magneto-optical recording medium comprising a first magnetic layer which is an in-plane (horizontal) magnetization layer at a room temperature but a perpendicular magnetization layer at a raised temperature, and a transition temperature of which increases continuously or stepwise from an incidence side of light in a film thickness direction, and a second magnetic layer which is a perpendicular magnetization layer.

Further, the above object can also be achieved by a method for reproducing information in a magneto-optical recording medium comprising a first magnetic layer which is a horizontal magnetization layer at room temperature but a perpendicular magnetization layer at a raised temperature, and a transition temperature of which continuously or stepwise increases from an incidence side of light in a film thickness direction, and a second magnetic layer which is a perpendicular magnetization layer, wherein the information recorded in the second recording layer is transferred to the first magnetic layer, whereby the information is read by the magneto-optical effect.

BRIEF DESCRIPTION OF THE DRAWINGS

FIG. 2 is a drawing to show the details of a method for reproducing information in the magneto-optical recording medium;

DETAILED DESCRIPTION OF THE PREFERRED EMBODIMENTS

Figure 1A:
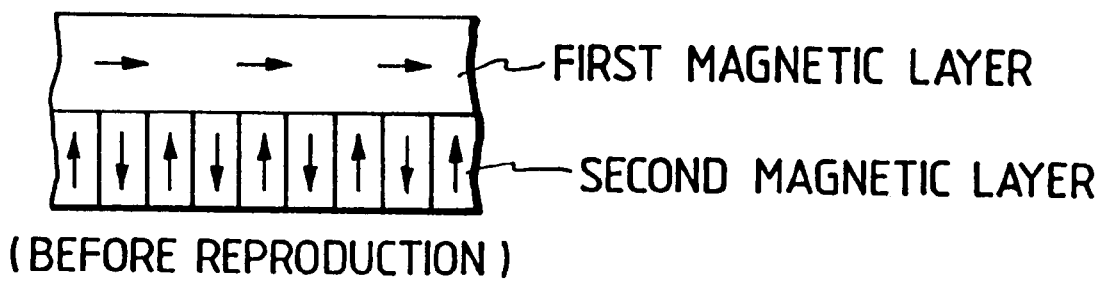
FIGS. 1A and 1B are drawings to show the schematic principle of reproduction of a magneto-optical recording medium of the present invention.

Magneto-optical recording media and a method for reproducing information therein according to the present invention will be described below in detail with reference to the accompanying drawings.

A magneto-optical recording medium of the present invention comprises at least a first magnetic layer composed of layered films, which is a horizontal magnetization layer at room temperature but a perpendicular magnetization layer at a raised temperature, and a transition temperature (a temperature at which the horizontal magnetization layer changes into the perpendicular magnetization layer) of which increases continuously or stepwise from an incidence side of light in a film thickness direction, and a second magnetic layer which is a perpendicular magnetization layer both at room temperature and at the raised temperature.

Structure and Composition of the Medium

The first magnetic layer is desirably made for example of a rare earth-iron group amorphous alloy such as GdCo, GdFeCo, GdTbFeCo, GdDyFeCo or NdGdFeCo. Preferably, a material for the first magnetic layer has weak magnetic anisotropy and a compensation temperature existing between the room temperature and a Curie temperature of the material.

The second magnetic layer is desirably made for example of a material having strong perpendicular magnetic anisotropy to maintain a magnetization state stably. For example, a rare earth-iron group amorphous alloy such as TbFeCo, DyFeCo or TbDyFeCo, garnet, platinum group-iron group periodic films such as Pt/Co or Pd/Co, or a platinum group-iron group alloy such as PtCo or PdCo is desired. In one embodiment, the first magnetic layer and the second magnetic layer each are made of a rare earth-transition metal amorphous alloy.

Further, in order to improve the corrosion resistance, an element such as Cr, Al, Ti, Pt or Nb may be added to the magnetic layers.

Further, in order to enhance the interference effect, a dielectric layer made of SiNx, AlNx, AlOx, TaOx or SiOx may be formed adjacent to either of the above magnetic layers.

Furthermore, in order to improve the thermal conductivity, a layer of Al, AlTa, AlTi, AlCr or Cu may be formed.

Yet furthermore, an intermediate layer to control an exchange coupling force or a magneto-static coupling force, or an assisting layer for recording assist or reproduction assist may be provided. In addition, a dielectric layer as described above or a protective coat of a polymer resin may be added as a protective layer.

Next described are a method for recording information in a magneto-optical recording medium of the present invention and a method for reproducing the information recorded.

(In the following description, described is a case where the first magnetic layer is composed of three films having respective transition temperatures different from one another (referred to as a reproduction layer, an intermediate layer 1 and an intermediate layer 2 from the incident side of light) and the second magnetic layer (referred to as a recording layer) is laminated directly on the first magnetic layer.)

Figure 7:
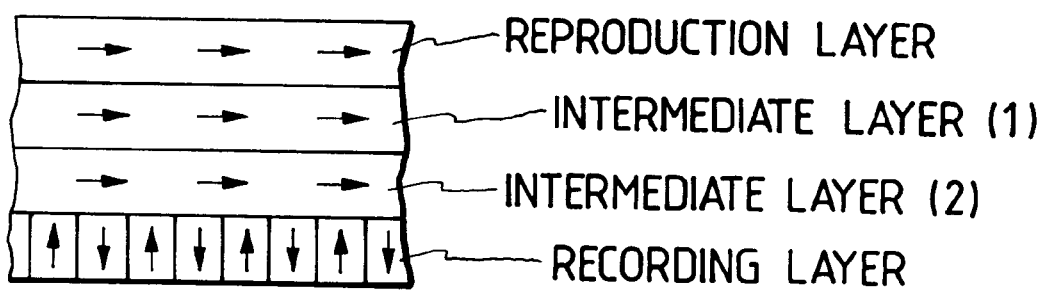
FIG. 7 is a drawing to show a state in which information is recorded in a magneto-optical recording medium of the present invention.

As shown in FIG. 7, information is first recorded in the recording layer in the magneto-optical recording medium of the present invention. Recording is conducted by irradiating a laser beam with power which can raise the temperature of the recording layer at least up to a Curie temperature thereof and modulating an external magnetic field, or, by once erasing all information and thereafter modulating laser power while applying a magnetic field in a recording direction to a recording area. Alternatively, the recording may be conducted by modulating the laser power while applying an external magnetic field to a recording area. In the recording, if an intensity of a laser beam is so determined that only a selected region within a laser spot comes to have the temperature near the Curie point of the recording layer, taking the linear velocity of the recording medium into consideration, magnetic recording domains smaller than the laser spot diameter can be formed. As a result, information can be recorded with a cycle less than the diffraction limit of light.

The medium is irradiated with a reproduction laser beam in reproducing information. Upon irradiation an irradiated spot increases its temperature. Since the medium moves at a constant speed, a temperature distribution on the medium has a shape extended in the moving direction of medium, in which only a portion within the laser spot becomes high in temperature, as shown in FIG. 2.

Incidentally, it is known about a single layer of magnetic thin film that the main direction of magnetization is determined by an effective perpendicular magnetic anisotropy constant $K\perp$ which is defined by the following formula:

$$K\perp = Ku - 2\pi M_s^2$$

where $M_s$ is a saturation magnetization and Ku is a perpendicular magnetic anisotropy constant. If $K\perp$ is positive, the layer is a perpendicular magnetization layer. On the other hand, if it is negative, the layer is a horizontal magnetization layer.

Figure 4A:
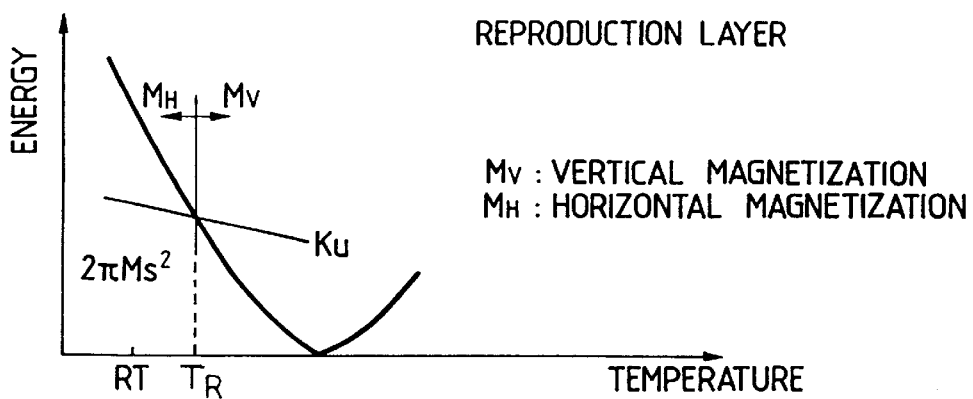
FIGS. 4A, 4B and 4C are drawings to show a relation among saturation magnetization, perpendicular magnetization anisotropy and temperature of each layer in case of a first magnetic layer comprising a reproduction layer and two intermediate layers.
Figure 4B:
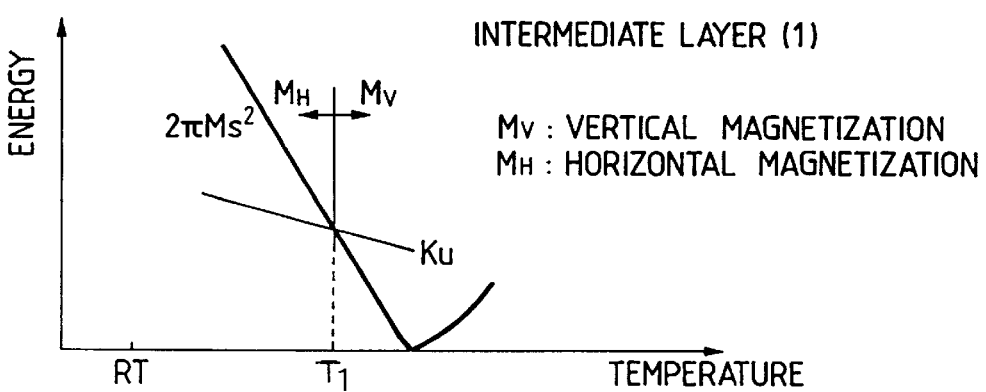
Figure 4C:
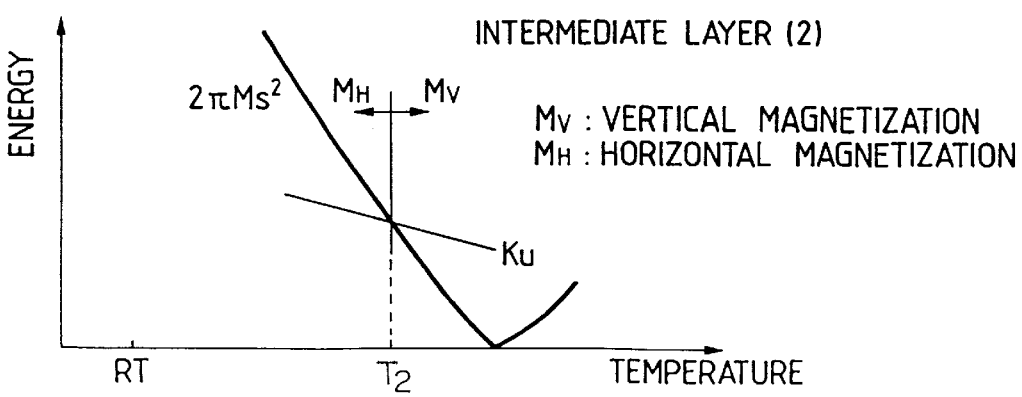

Here, $2\pi M_s^2$ is demagnetizing energy. If the layers are formed in the relations among the temperature, the saturation magnetization M., and the perpendicular magnetic anisotropy constant Ku as shown in FIGS. 4A, 4B, 4C, $$Ku < 2\pi M_s^2 \text{ and then } K\perp < 0,$$

at room temperature (RT). Thus, the layers each are kept as a horizontal magnetization layer at RT (room temperature). On the other hand, the temperature is raised during reproduction, and $M_s$ of each magnetic layer in the first magnetic layer becomes smaller. As a result, $2M_s^2$ becomes rapidly smaller, whereby the above relation to the perpendicular magnetic anisotropy constant Ku becomes inverted. Namely, $$Ku > 2\pi M_s^2 \text{ and then } K\perp > 0$$

at the raised temperature. Then, the layers each can be changed into a perpendicular magnetization layer as the temperature increases.

Namely, if the saturation magnetization $M_s$ and the perpendicular magnetic anisotropy constant Ku of each of the reproduction layer, the intermediate layer 1 and the intermediate layer 2 are so set, taking an intensity and a linear velocity of laser beam during reproduction into consideration, then each of the reproduction layer, the intermediate layer 1 and the intermediate layer 2 becomes perpendicularly magnetized in accordance with the temperature distribution within the laser spot as shown in FIG. 2, only a portion of each layer is perpendicularly magnetized in a desired temperature region within the laser spot, while other portions remain as a horizontal magnetization layer. Further, when the reproduction layer, the intermediate layer 1 and the intermediate layer 2 are perpendicularly magnetized, they are magnetically coupled with adjacent layers by exchange coupling. As a result, the magnetization in the reproduction layer, the intermediate layer 1 or the intermediate layer 2 is stably aligned with the magnetization direction based on information in an adjacent layer. In other words, the information recorded in the recording layer is transferred to the reproduction layer. Then, the information thus transferred is converted into an optical signal by the magneto-optical effect of the reproduction layer (more particularly, by the magneto-optical effect of the laser beam reflected on the reproduction layer) and the thus converted signal is detected. In this case, there is no magneto-optical effect appearing in the horizontal magnetization portions in the reproduction layer within the laser spot.

In case a perpendicular magnetization layer is laminated directly or via an intermediate layer on the first magnetic layer, a temperature region for perpendicular magnetization is shifted to a lower temperature side as compared with a non-laminated case. This is because Ku becomes apparently increased by the exchange coupling force from the magneto-static coupling force of the perpendicular magnetization layer. However, if the perpendicular magnetization temperature region of the single layer before it is laminated is set to be slightly higher, it is possible to establish such a condition that the first layer is a horizontal magnetization layer at room temperature but a perpendicular magnetization layer-at a raised temperature, after the perpendicular magnetization layer is laminated on the first layer.

Here, the reproduction layer, the intermediate layer 1 and the intermediate layer 2 in the first magnetic layer have mutually different transition temperatures at which each respective layer changes from a horizontal magnetization layer to a perpendicular magnetization layer (i.e., magnetization direction transition temperatures) and the magnetization direction transition temperatures are set to increase in the order of the reproduction layer, the intermediate layer 1 and the intermediate layer 2 (the intermediate layer 2 has the highest transition temperature). Hereinafter, the transition temperatures of the reproduction layer, intermediate layer 1 and intermediate layer 2 are represented by $T_R$, $T_1$ and $T_2$, respectively, and the medium temperature is represented by T.

As described above, a part of each of reproduction layer, the intermediate layer 1 and the intermediate layer 2 becomes perpendicularly magnetized within the laser spot during reproduction (FIG. 2), and the perpendicular magnetization portions therein become larger in the order of the intermediate layer 2, the intermediate layer 1 and the reproduction layer.

In more detail, a portion (the temperature $T \geq T_2$ region) of magnetization in the intermediate layer 2 adjacent to the recording layer becomes perpendicularly magnetized during reproduction to be exchange-coupled with the recording layer, and the magnetization of that portion becomes aligned in a stable direction relative to the magnetization direction of information recorded in the recording layer. At the same time, a portion of magnetization in the intermediate layer 1 (the temperature $T \geq T_1$, region which is wider than the temperature $T \geq T_2$ region) also becomes perpendicularly magnetized to be exchange-coupled with the intermediate layer 2, and the magnetization of that portion is aligned in a stable direction relative to the magnetization direction in the perpendicular magnetization portion of the intermediate layer 1. Furthermore, a portion of the reproduction layer (the temperature $T \geq T_R$ region that is wider than the temperature $T \geq T_2$ region) becomes simultaneously perpendicularly magnetized to be exchange-coupled with the intermediate layer 1, and the magnetization of that portion is aligned in a stable direction relative to the magnetization direction in the perpendicular magnetization portion of the intermediate layer 1. As a result, a bit in the recording layer is transferred to the reproduction layer in an enlarged scale.

As described above, a micro bit formed in the recording layer is transferred in an enlarged scale to the reproduction layer, which contributes most to the C/N ratio in reproduction. Accordingly, the C/N ratio is remarkably improved as compared with the conventional magnetic super resolution.

Further, the method for reproducing information according to the present invention, can permit reproduction of a bit without being affected by adjacent bits in the track direction and in the radial direction, whereby both the linear recording density and the track density can be improved to realize a great improvement in the recording density.

Figure 1B:
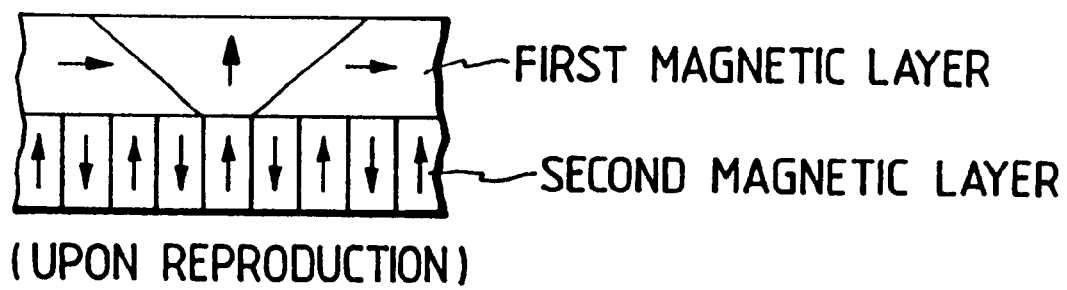
Figure 3A:
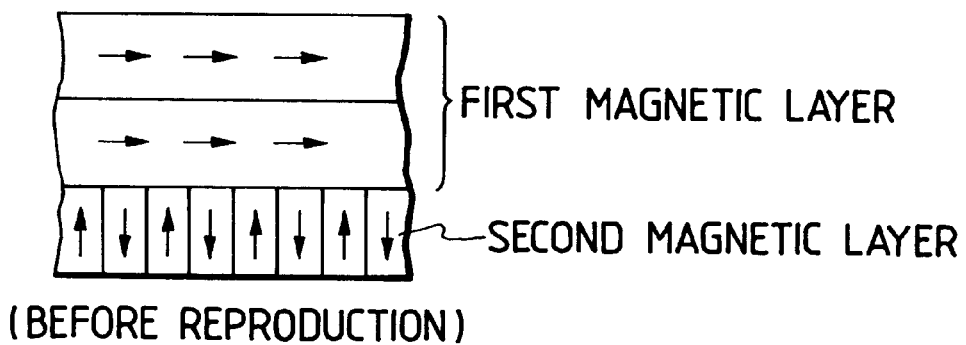
FIGS. 3A and 3B are drawings to show the details of a method for reproducing information in the magneto-optical recording medium.
Figure 3B:
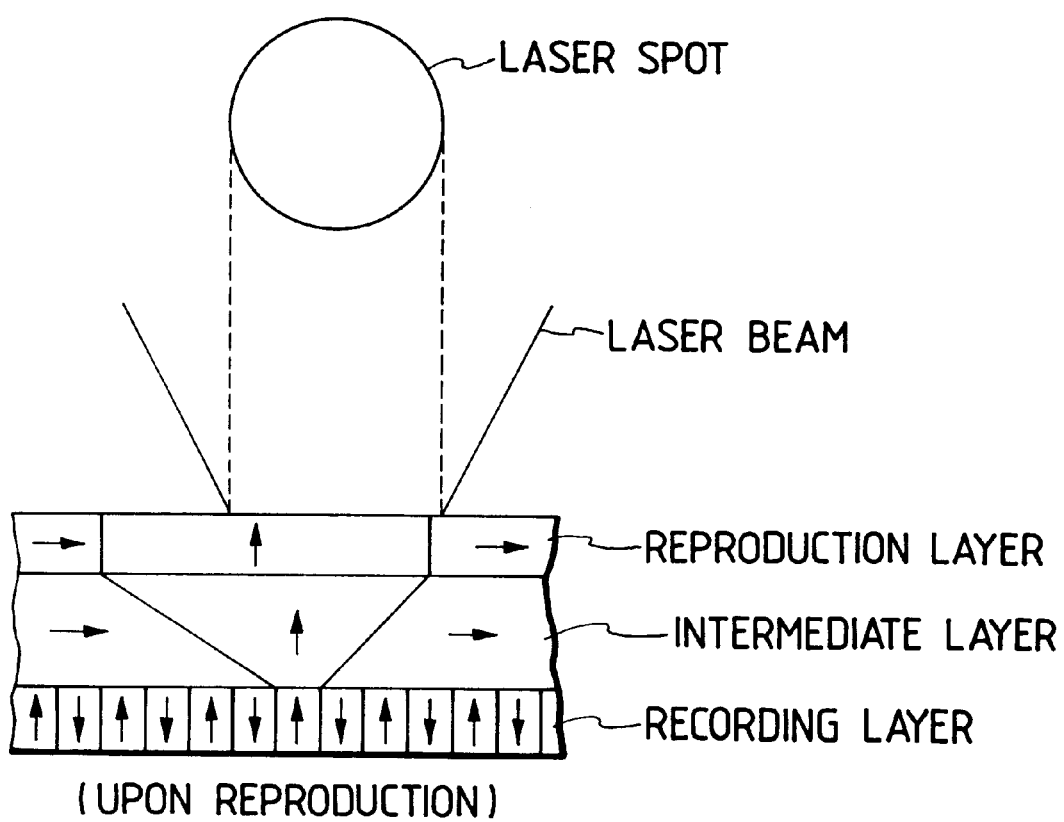

The above description concerned a case where the first magnetic layer was composed of three layers (reproduction layer and two intermediate layers) having different transition temperatures from each other. In another case, the first magnetic layer may be composed of a reproduction layer having a certain transition temperature and an intermediate layer laminated thereon the transition temperature of which is continuously changed (FIGS. 3A and 3B). Or, the first magnetic layer may be composed of a single composition-graded layer the composition of which is continuously changed (FIGS. 1A and 1B).

Further, the above description showed a case where the magnetic layers were magnetically coupled with each other by the exchange interaction. In a modification, the layers may be magnetically coupled with each other by the magneto-static coupling.

Furthermore, in order to make the transfer clearer, an intermediate layer different in Curie temperature may be formed between the magnetic layers.

The present invention will be described in more detail referring to experimental examples, but it should be understood that the present invention is not limited to the specific examples, but involves all embodiments constructed without departing from the scope of the invention.

EXAMPLE 1

Targets of Si, Tb, Gd, Fe and Co were set in a direct current (DC) magnetron sputtering system and a polycarbonate substrate 1 was fixed in a substrate holder. Then, the chamber was evacuated to high vacuum of at most $1 \times 10^{-5}$ Pa by means of cryopump.

Figure 6A:
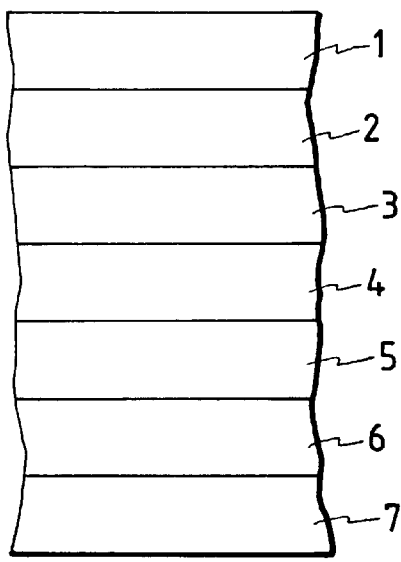
FIGS. 6A and 6B are schematic drawings to show a film structure of the present invention.

While evacuating to vacuum, Ar gas was introduced into the chamber up to 0.3 Pa. Then, a SiN layer 2 (dielectric layer) as an interference layer 2 was formed in thickness of 700 Å; a GdFeCo layer 3 as a reproduction layer 3 was then formed in thickness of 400 Å; a GdFeCo layer 4 as a first intermediate layer 4 was next formed in thickness of 50 Å; a GdFeCo layer 5 as a second intermediate layer 5 was formed in thickness of 50 Å; a TbFeCo layer 6 as a recording layer 6 was formed in thickness of 300 Å; and a SiN layer 7 (dielectric layer) as a protective layer 7 was finally formed in thickness of 700 Å in the named order to obtain a magneto-optical recording medium of a layered film structure (as shown in FIG. 6A).

During the formation of the SiN layers, $N_2$ gas was introduced in addition to Ar gas and the film formation was conducted by DC reactive sputtering. The GdFeCo layer and the TbFeCo layer were formed by applying DC power to each target of Gd, Fe, Co and Tb.

The composition of the GdFeCo reproduction layer was so set that the compensation temperature was 150° C. and the Curie temperature was at least 350° C.

The composition of the first GdFeCo intermediate layer was so set that the compensation temperature was 220° C. and the Curie temperature was at least 350° C.

The composition of the second GdFeCo intermediate layer was so set that the compensation temperature was 280° C. and the Curie temperature was at least 350° C.

The composition of the TbFeCo recording layer was so set that the layer was TM-rich at room temperature and that the Curie temperature was 200° C.

Then, recording and reproduction characteristics were measured using the magneto-optical recording medium thus obtained.

The measuring apparatus had NA of objective lens and a laser wavelength being 0.55 and 780 nm, respectively. Recording power was from 8 to 10 mW, and linear velocity was 9 m/s (rotational speed: 2400 rpm, radius: 36 mm). A carrier signal of from 5.8 to 18 MHz was written in the recording layer by the magnetic modulation method to evaluate recording frequency dependency of the C/N ratio. Applied field was ±150 Oe.

Reproduction power was so set that the C/N ratio became maximum.

Figure 5:
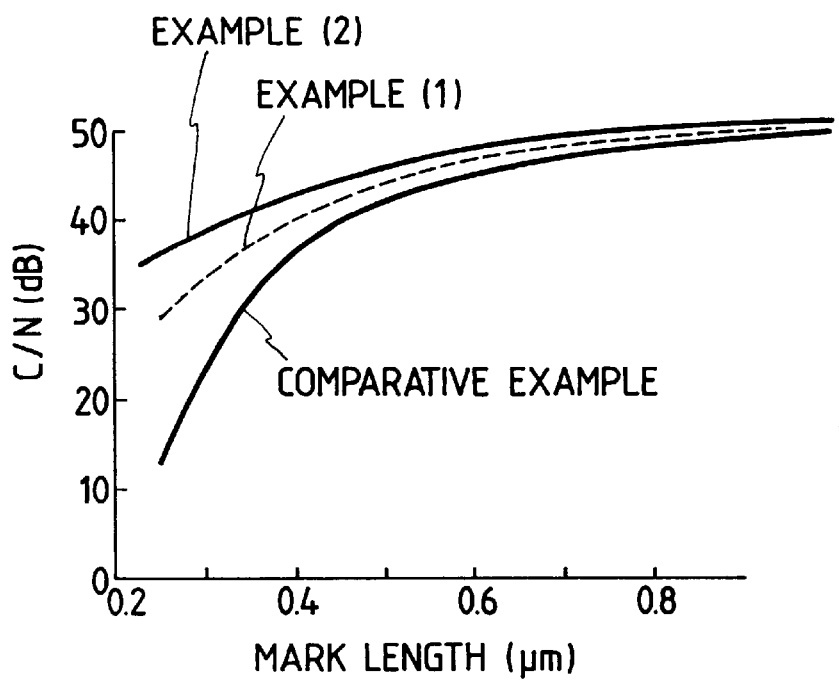
FIG. 5 is a drawing to show C/N ratios of magneto-optical recording media of the present invention.

The results thus obtained are shown in FIG. 5.

EXAMPLE 2

Thin layers were formed on a polycarbonate substrate 1 by the same film-forming machine and method as in Example 1 to obtain a magneto-optical recording medium, which was evaluated under the same conditions as in Example 1.

Figure 6B:
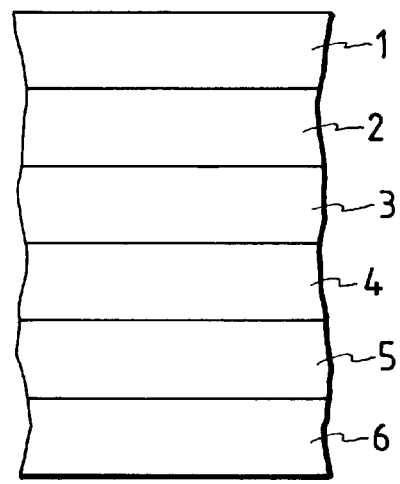

A SiN layer 2 (dielectric layer) as an interference layer 2 was formed in thickness of 820 Å; a GdFeCo layer 3 as a reproduction layer 3 was formed in thickness of 400 Å; a GdFeCo layer 4 as a composition-graded intermediate layer 4 was formed in thickness of 100 Å; a TbFeCo layer 5 as a recording layer 5 was formed in thickness of 400 Å; and a SiN layer 6 (dielectric layer) as a protective layer 6 was formed in thickness of 700 Å in the named order to obtain a magneto-optical recording medium of a laminated film structure (as shown in FIG. 6B).

The composition of the GdFeCo reproduction layer was so set that the compensation temperature was 280° C. and the Curie temperature was at least 350° C.

The composition of the GdFeCo composition-graded intermediate layer was so set that the compensation temperature and the Curie temperature were 170° C. and at least 350° C. respectively, on the side adjacent to the reproduction layer and the compensation temperature and the Curie temperature were 290° C. and at least 350° C. respectively, on the side adjacent to the recording layer, and that the compensation temperature was continuously changed in the film thickness direction.

The composition of the TbFeCo recording layer was so set that the layer was TM-rich at room temperature, and the Curie temperature was 200° C.

The results thus obtained are shown in FIG. 5.

COMPARATIVE EXAMPLE

Thin layers were formed on a polycarbonate substrate by the same film-forming machine and method as in Example 1 to obtain a magneto-optical recording medium, which was evaluated under the same conditions as in Example 1.

A SiN layer as an interference layer was formed in thickness of 850 Å; a GdFeCo layer as a reproduction layer was formed in thickness of 400 Å; a TbFeCo layer as a recording layer was formed in thickness of 400 Å; and a SiN layer as a protective layer was formed in thickness of 700 Å in the named order to obtain a magneto-optical recording medium of a layered film structure. The composition of the GdFeCo reproduction layer was so set that the compensation temperature was 280° C. and the Curie temperature was at least 350° C. The composition of the TbFeCo recording layer was so set that the layer was TM-rich at room temperature, and the Curie temperature was 200° C.

The results thus obtained are shown in FIG. 5.

Using the magneto-optical recording medium and the method for reproducing information recorded in the medium according to the present invention, magnetic domains smaller than a beam spot diameter can be reproduced as enlarged by means of a simple apparatus without an initialization magnet (conventional apparatus), which enables to achieve high-density recording further improved in the linear recording density and the track density so as to improve the C/N ratio.

What is claimed is:

1. A magneto-optical recording medium comprising:

a transparent substrate;

a first magnetic layer comprised of a rare earth-transition metal amorphous alloy formed on said transparent substrate, said first magnetic layer having in-plane magnetization at room temperature and perpendicular magnetization at a second temperature higher than said room temperature, and a transition temperature at which a portion of the first magnetic layer changes from in-plane magnetization to perpendicular magnetization, wherein as the distance away from the substrate in the direction of the thickness of the first magnetic layer increases, the transition temperature increases; and a second magnetic layer located at a side of said first magnetic layer opposite to the substrate, said second magnetic layer having a perpendicular magnetization at a temperature range between room temperature and Curie temperature of the second magnetic layer.

2. The magneto-optical recording medium according to claim 1, wherein said first magnetic layer is comprised of a plurality of sublayers, wherein the composition of each sublayer is uniform, and wherein the transition temperature of adjacent sublayers increases in the direction of the thickness of the first magnetic layer away from the substrate.

3. A method of reading out information recorded in a second magnetic layer of a magneto-optical recording medium, having a transparent substrate; a first magnetic layer comprised of a rare earth-transition metal amorphous alloy formed on said transparent substrate, said first magnetic layer comprised of a plurality of laminated sublayers, wherein each laminated sublayer has a transition temperature at which the laminated sublayer changes from in-plane magnetization to perpendicular magnetization, wherein as the distance away from the transparent substrate in the direction of the thickness of the first magnetic layer increases the transition temperature of each sublayer increases; and a second magnetic layer located at a side of said first magnetic layer opposite said substrate, said second magnetic layer having a perpendicular magnetization at a temperature range between room temperature and Curie temperature of the second magnetic layer, comprising the steps of:

(a) irradiating the magneto-optical recording medium with a laser beam from the substrate side thereby perpendicularly magnetizing a portion of said first magnetic layer, wherein information recorded in the second magnetic layer as a micro bit is transferred to the perpendicularly magnetized portion of the first magnetic layer by a magnetic coupling force, the micro-bit of transferred information in the perpendicularly magnetized portion of the first magnetic layer being larger in each laminated sublayer as the distance from the laminated sublayer to the substrate decreases; and (b) reading out the information with the laser beam reflected from said medium by means of a magneto-optical effect.

* * * * *

UNITED STATES PATENT AND TRADEMARK OFFICE
CERTIFICATE OF CORRECTION

PATENT NO. : 6,187,460 B1
DATED : February 13, 2001
INVENTOR(S) : Naoki Nishimura Page 1 of 2

It is certified that error appears in the above-identified patent and that said Letters Patent is hereby corrected as shown below:

Title page,
Item [56] References Cited, OTHER PUBLICATIONS,
""Transitio9n" should read -- Transition --.
Item [57] ABSTRACT,
Line 7, delete "light".

Column 1,
Line 25, "Recently" should read -- Recently, the -- and "is high" should be deleted;
Line 38, "and" should read -- an --.

Column 2,
Line 28, delete "of".

Column 4,
Line 34, "magnetization M.," should read -- magnetization $M_s$, --;
Line 42, "$2M_s^2$" should read -- $2\pi M_s^2$ --.

Column 5,
Line 24, "layer-at" should read -- layer at --;
Line 41, "each of" should read -- each of the --;
Line 56, "$T \geq T_1$, region" should read -- $T \geq T_1$ region --;
Line 63, "region that" should read -- region, which --.

Column 6,
Line 10, "invention," should read -- invention --;
Line 56, "Åin" should read -- Å in --.

UNITED STATES PATENT AND TRADEMARK OFFICE
CERTIFICATE OF CORRECTION

PATENT NO. : 6,187,460 B1
DATED : February 13, 2001
INVENTOR(S) : Naoki Nishimura It is certified that error appears in the above-identified patent and that said Letters Patent is hereby corrected as shown below:

Column 8,
Line 50, "substrate; a" should read -- substrate; ¶ a --.

Column 9,
Line 5, "micro bit" should read -- micro-bit --.

Signed and Sealed this

Eighth Day of January, 2002

Attest:

Attesting Officer

JAMES E. ROGAN
Director of the United States Patent and Trademark Office